United States Patent [19]
Brueckheimer et al.

[11] Patent Number: 5,923,680
[45] Date of Patent: Jul. 13, 1999

[54] ERROR CORRECTION IN A DIGITAL TRANSMISSION SYSTEM

[75] Inventors: Simon Daniel Brueckheimer, London; David John Stacey, Herts, both of United Kingdom

[73] Assignee: Northern Telecom Limited, Montreal, Canada

[21] Appl. No.: 08/869,352

[22] Filed: Jun. 5, 1997

[51] Int. Cl.[6] .................................................. H03M 13/00
[52] U.S. Cl. .................. 371/37.7; 371/37.02; 371/37.07; 371/38.1
[58] Field of Search .................. 371/37.01, 37.2, 371/37.7, 38.1, 39.1, 37.02, 37.07

[56] References Cited

U.S. PATENT DOCUMENTS

| | | | |
|---|---|---|---|
| 3,771,126 | 11/1973 | Apple, Jr. .................. | 340/146.1 AL |
| 3,775,746 | 11/1973 | Boudreau et al. ............. | 340/146.1 AL |
| 4,435,807 | 3/1982 | Scott et al. .................. | 371/50 |
| 4,592,054 | 5/1986 | Namekawa et al. ............ | 371/39 |
| 5,179,560 | 1/1993 | Yamagishi et al. ............ | 371/38.1 |

FOREIGN PATENT DOCUMENTS

| | | |
|---|---|---|
| 2131253 | 6/1984 | United Kingdom . |
| WO92/21086 | 11/1992 | WIPO . |
| WO95/28046 | 10/1995 | WIPO . |

OTHER PUBLICATIONS

Dravida, "Error Control Aspects of High Speed Networks", INFOCOM '92, pp. 272–281, Dec. 1992.

*Primary Examiner*—Stephen M. Baker
*Attorney, Agent, or Firm*—John D. Crane

[57] ABSTRACT

Random bit errors in a digital transmission system in which data is scrambled and subsequently descrambled are detected by parsing the descrambled data into words, determining a syndrome error word for each data word, and determining a parity error word for each data word. A data word is left uncorrected when its corresponding syndrome error and parity error words are both zero. Single bit error correction of a data word is effected when its corresponding syndrome error and parity error words are both non-zero. Double or multiple bit error correction of a data word is effected when its corresponding parity error word is zero and its corresponding syndrome error word is non-zero.

14 Claims, 5 Drawing Sheets

$r(x) = t(x) + e(x)$ $o(x) = t'(x) + e'(x)$ $e'(x) = e(x)(x^{43}+1)$

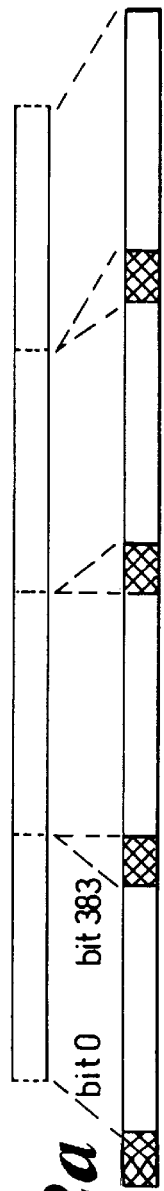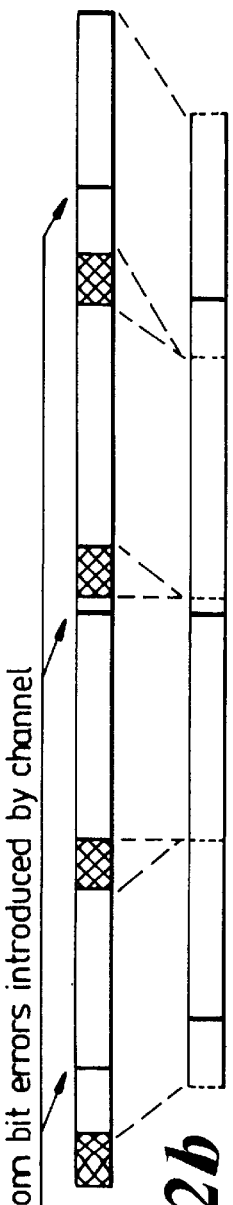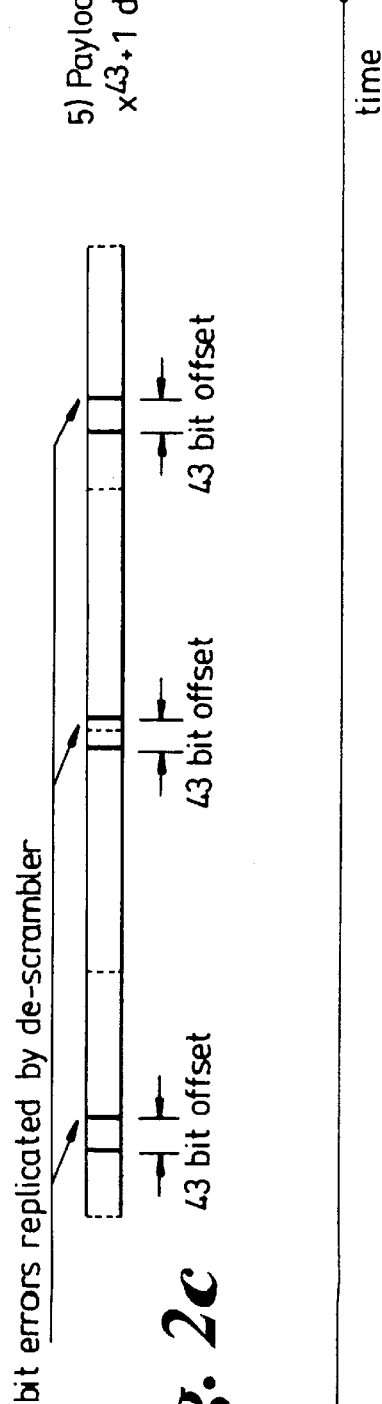

| parity | syndrome | detected bit error position | action |
|---|---|---|---|
| 0 | 0 | N/A | No error detected |
| 1 | non-zero | bits 0 to 42 & bits 341 to 383 | Single bit error correction |
| 1 | non-zero | bits 43 to 383 | Multiple bit errors detected |
| 0 | non-zero | bits 0 to 42 | Double bit error detected &corrected |
| 0 | non-zero | bits 341 to 383 | Multiple bit errors detected |
| 1 | zero | N/A | Multiple bit errors detected |

*Fig. 5*

ERROR CORRECTION IN A DIGITAL TRANSMISSION SYSTEM

BACKGROUND OF THE INVENTION

The correction of random bit errors is a key requirement for digital transmission systems. A number of techniques, for example parity checking and the use of coded sequences have been described for performing this function. A general discussion of error correction techniques is given "Error Control Coding" by Shu Lin and David J. Costello Jnr (Prentice Hall-ISBN 0-13-283796-X). Reference is also directed to specification No. U.S. Pat. No. 5,367,544 which describes a modified CRC decoder which uses parity check bits for frame synchronisation as well as for the usual detection and possible correction of the header.

In particular, error correction is becoming increasingly important in ATM (asynchronous transfer mode) and other digital transmission systems where traffic from a number of different users is multiplexed together into ATM cells or into virtual containers which are routed over a common connection. A particular problem with these systems is that of error multiplication where payloads have been scrambled and subsequently descrambled. This can lead to duplication of errors within a cell, or, depending on the position of the error in a cell, the introduction of a duplicated error in the next cell. Present systems do not differentiate between these duplicated errors and isolated errors and this can lead to miscorrection of some errors and thus to the introduction of new errors.

SUMMARY OF THE INVENTION

An object of the invention is to minimise or to overcome this disadvantage.

A further object of the invention is to provide an improved apparatus and method for detection and correction of single bit or symbol errors and multiple errors in a digital transmission system.

According to one aspect of the invention there is provided a method of detecting and correcting random symbol errors in a digital transmission system, the method comprising determining whether an error is an isolated symbol error or a multiple error, and performing separate correction of isolated and multiple errors.

According to another aspect of the invention there is provided a method of detecting and correcting random bit errors in a digital transmission system in which data is scrambled and subsequently descrambled, the method including parsing the descrambled data into words, determining a syndrome error word for each said data word, determining a parity error word for each said data word, leaving a said data word uncorrected when its corresponding syndrome error and parity error words are both zero, performing single bit error correction of a said data word when its corresponding syndrome error and parity error words are both non-zero, and performing double bit error correction of a said word when its corresponding parity error word is zero and its corresponding syndrome error word is non-zero.

According to a further aspect of the invention there is provided an arrangement for detecting and correcting random bit errors in a digital transmission system in which data is scrambled and subsequently descrambled, the arrangement including means for parsing the descrambled data into words, means for determining a syndrome error word for each said data word, means for determining a parity error word for each said data word and for leaving a said data word uncorrected when its corresponding syndrome error and parity error words are both zero, first correction means for performing single bit error correction of a said data word when its corresponding syndrome error and parity error words are both non-zero, and second correction means for performing double bit error correction of a said word when its corresponding parity word is zero and its corresponding syndrome error word is non-zero.

According to a further aspect of the invention there is provided a digital transmission system comprising a transmitter incorporating means for scrambling data, a receiver incorporating means for descrambling the scrambled data received over a transmission channel from the transmitter and having means for detecting and correcting bit errors in the descrambled data, means for parsing the descrambled data into words, means for determining a syndrome error word for each said data word, means for determining a parity error word for each said data word and for leaving a said data word uncorrected when its corresponding syndrome error and parity error words are both zero, first correction means for performing single bit error correction of a said data word when its corresponding syndrome error and parity error words are both non-zero, and second correction means for performing double bit error correction of a said word when its corresponding parity error word is zero and its corresponding syndrome error word is non-zero.

It will be appreciated that multiple bit errors introduced by descrambling will be random in the sense that the first of the errors from which the multiple errors have been generated will be random, but the remaining multiple errors of the set will be at fixed distances from the error generating the set.

The symbols may represent corresponding elements of a Galois field and may compprise a cyclic or other linear code.

The technique makes use of a class of cyclic redundancy checksums (CRC) with the ability to perform simultaneous correction and detection to discriminate between isolated bit errors and error multiplication effects caused by physical layer scramblers and line-codes.

An example of this technique is the use of a class of code words for single bit correction and double bit detection which takes the form of an $(x+1) \cdot f(x)$ polynomial where $f(x)$ is a primitive or irreducible polynomial.

This operation is extended to perform single bit error correction and double bit error correction to take account of double bit error multiplication effects introduced by many scramblers and line-codes. With the use of code words of greater Hamming distance the method can be extended to perform correction to take account of error multiplication of greater than 2 times.

In a preferred embodiment of the invention a CRC-10 cyclic redundancy code is used to provide error protection over part or all of the payloads of ATM cells. The invention enables random bit errors introduced in the channel to be detected and corrected irrespective of the error multiplication introduced by a scrambler, e.g. an $x^{43}+1$ scrambler. The use of a scrambler is well recognised when transporting ATM cells over synchronous frame structures in the SDH (synchronous digital hierarchy) and PDH (plesiochronous digital hierarchy). One application of the technique is the use of the CRC-10 cyclic redundancy code to protect payload data within the newly emerging, composite user adaptation layer (AAL-CU) although any other CRC of similar properties may be applied in this manner.

BRIEF DESCRIPTION OF THE DRAWINGS

An embodiment of the invention will now be described with reference to the accompanying drawings in which:

FIGS. 2a, 2b and 2c show typical ATM payload sequences respectively prior to scrambling at the transmitter, after scrambling, and after descrambling at the receiver;

FIG. 5 is a table illustrating the correction of errors by the decoder/error correction arrangement of FIGS. 3 and 4.

DESCRIPTION OF PREFERRED EMBODIMENT

Figure 1A:
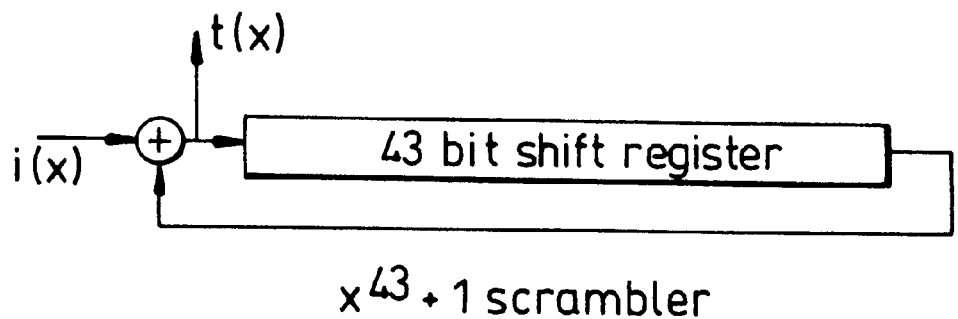
FIG. 1a and 1b illustrate respectively the construction of a transmitter scrambler and a corresponding receiver descrambler for use in a digital transmission system.
Figure 1B:
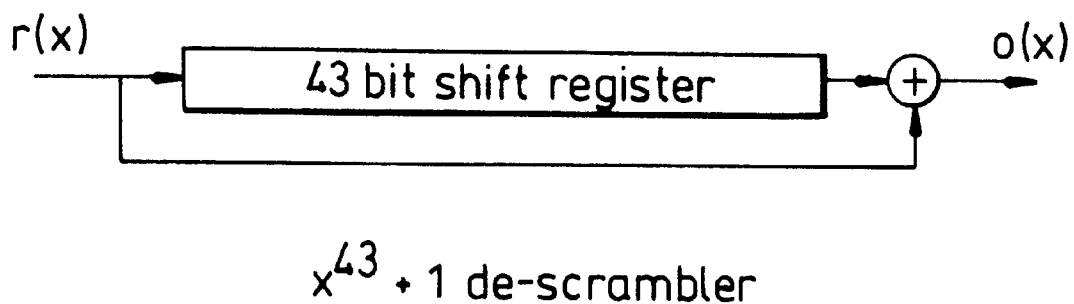

The implementation of a $x^{43}+1$ scrambler and de-scrambler employed in a digital transmission system is shown in FIGS. 1a and 1b respectively. The operation of the scrambling and de-scrambling process is well known to those skilled in the art. Essentially, the scrambler circuit (FIG. 1a) performs a summation of the current bit sample i(x) with a running sum of previous samples occurring at integer multiples of 43 bit offsets from the current sample to produce the scrambled output t(x). The de-scrambler (FIG. 1b) operates on the received signal r(x) to reverse the scrambling process by subtracting the current data sample from the previous data sample offset by 43 bit positions.

The received signal r(x) is related to the scrambled transmitted signal t(x) by the expression $$r(x)=t(x)+e(x)$$

where e(x) represents an error introduced during transmission.

If there have been no errors introduced by transmission over the communications channel, i.e. e(x) is zero, the output of the de-scrambler will exactly match the original input to the scrambler. However if a bit error has been introduced by transmission over the communications channel, i.e. e(x) is non-zero, then the action of the de-scrambler is such that the output stream will always contain two bit errors—one at the original bit position of the corrupted data sample, the other displaced by 43 bit positions. Scramblers of this type in general multiply errors by the number of coefficients in their polynomial circuits.

The output o(x) of the descrambler is given by the expression $$o(x)=t'(x)+e'(x)$$

where $$i\ e'(x)=e(x)(x^{43}+1)$$

It is important to note that it is only the payload of the ATM cell that is scrambled. The ATM header is not fed to the scrambler. FIG. 2a illustrates this. The payloads of the ATM cells are fed in a continuous manner into the scrambler. The ATM cell headers are appended to the payloads and transmitted across the communications channel. At the receive station the process is reversed as shown in FIG. 2b. The headers are removed and the payloads fed into the de-scrambler. In the absence of errors the output is identical to the input. However if bit errors are introduced by the channel then the de-scrambling process will multiply them, each single bit error resulting in 2 bit errors in the de-scrambled payload as shown in FIG. 2c. The duplicated errors are offset from each other by 43 bits. Additionally, as the payloads are applied continuously to the scrambler a single bit error in one payload may spill over into the following payload due to this multiplication effect. Thus if the original bit in error occurs in payload bit positions 0 to 341 then the second bit error will occur in the same ATM payload which will then contain a double bit error. If however the original bit error occurs in payload bit position 342 to 383 then the secondary error will spill into the following payload and two consecutive ATM payloads will then each contain a single bit error.

To address this problem, we employ a cyclic redundancy code to perform error detection and correction over all or part of the ATM payload. The preferred CRC-10 code described below comprises a 9th degree primitive polynomial code multiplied by (x+1). This code may be used to perform single bit correction and multiple bit detection over up to 511 bits. As the standard ATM payload is just 384 bits, the code is shortened. It will thus be appreciated that there will be unused syndromes even if the full payload is protected by the CRC. It is important to note that although the scrambling process is continuous the generation and decoding of the CRC is a blocked operation which occurs over a single (or part) of a payload only. The CRC operation is not dependent on previously occurring ATM samples. The generation of the CRC is performed prior to the scrambling process and the detection/correction performed after the de-scrambling process.

The following analysis demonstrates that, using our technique, single random bit error correction is feasible post-multiplication by the scrambling process.

The CRC-10 polynomial:

$$x^{10}+x^9+x^4+x+1$$

can be factorised into the form:

$$(x^9+x^4+1)\cdot(x+1)$$

both factors being irreducible or primitive polynomials. We can define the set of code words that the $x^9$ polynomial generates as C1. Then the set of code words that the $x^{10}$ polynomial generates, C2, must be all those code words in C1 that are also divisible by (x+1), i.e. those with even parity. This ensures that the minimum Hamming distance of the set C2 is at least 4, ensuring that the code can simultaneously correct single bit errors and detect double bit errors. As a result, the syndromes caused by double bit errors are distinct from those to correct single bit errors.

Since there is a fixed relationship between error multiplication caused by the scrambler and any line code (in the case of the $x^{43}+1$ scrambler this will be a multiplication by 2, of 43 bits separation), there is a fixed mathematical relationship between the syndrome and the bits in error. Thus, the CRC-10 code employed can simultaneously correct those 86 single bit error positions, and those 341 double bit positions.

Figure 3:
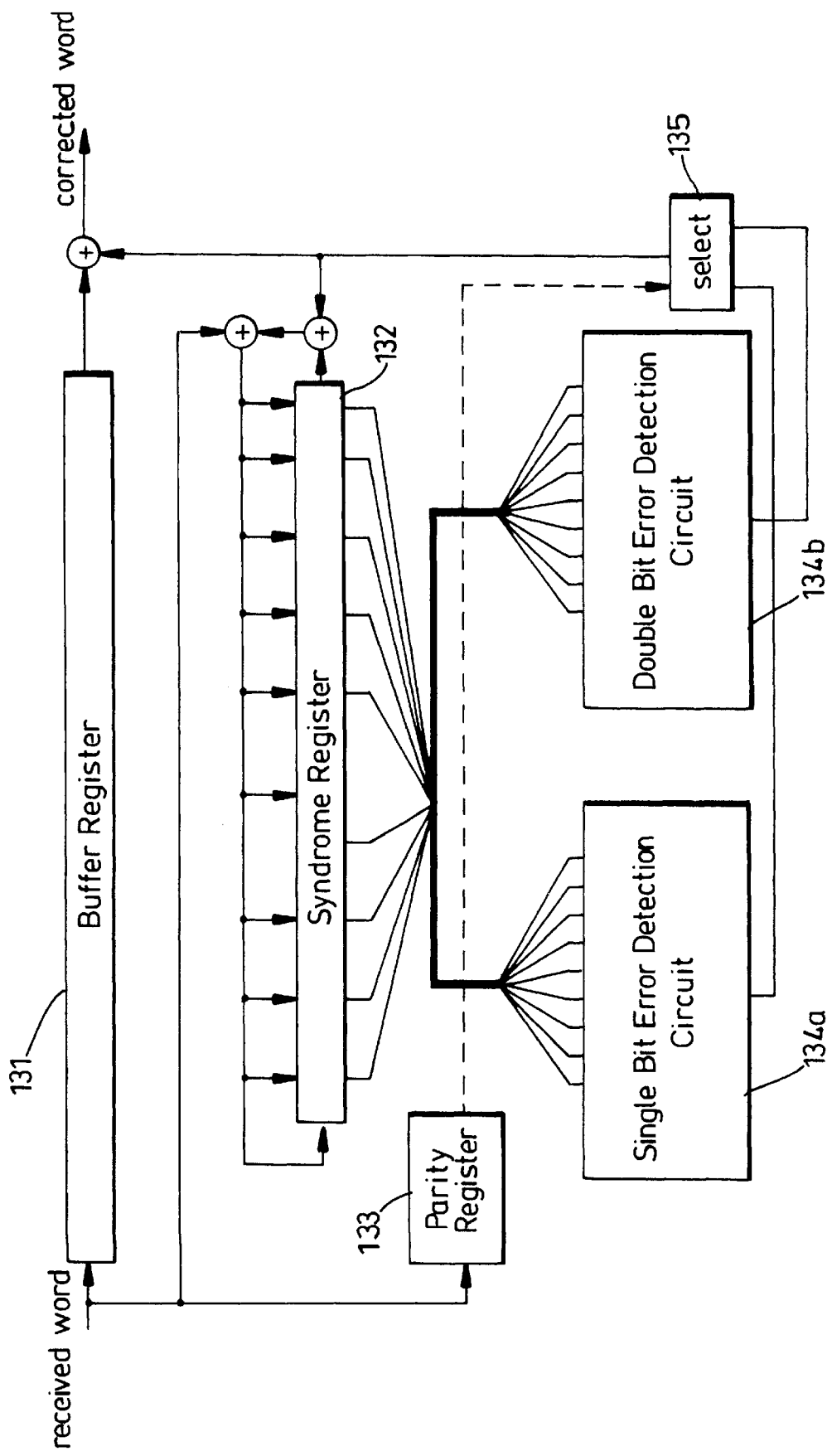
FIG. 3 shows in schematic form a decoder/error correction arrangement according to an embodiment of the invention.

The decoding of the received code-word post de-scrambling is performed by the decoder/error correction arrangement shown in schematic form in FIG. 3.

The decoder/error correction arrangement of FIG. 3 comprises four main blocks: a buffer register 131 that is used for temporary storage of the received code-word whilst the initial syndrome is computed; a CRC syndrome register 132 that computes the error syndrome from the received word; an x+1 parity register 133 that checks the parity of the received word; and an error correction stage that detects the bit positions of the bits in error and corrects them. The error correction stage includes of two circuits. One circuit 134a is used to detect and correct single bit errors, the other circuit 134b detects and corrects double bit errors. A selection circuit 135 selects on or other of the outputs of the error correction circuits 134a, 134b according to whether a single bit error or a double bit error has been corrected.

The received word is shifted simultaneously into the buffer register 131, the syndrome register 132 and the parity register 133. The syndrome register is used to compute a syndrome error word, a non zero value indicating that an error has been detected in the received word.

The parity register computes a parity check on the received word. If a value of ONE is computed, this indicates that the parity register has detected an odd number of errors in the received word. If a value of ZERO is computed, this indicates that either no bit errors or an even number of bit errors have been computed in the received word.

The computed syndrome and the computed parity are decoded to determine the status of the received word. A zero syndrome and zero parity indicates that no error has been detected in the received word. The received word is then assumed error free and no further corrective action is required.

If a non-zero syndrome and non-zero parity are computed it is assumed that the received word is in error by a single bit. The single bit detection circuit is therefore selected and corrective action taken. This corrective action is detailed below.

If the parity is zero (an odd number of errored bits is not detected by the parity check) and the syndrome is non-zero (an error detected by the syndrome decoder) then it is assumed that a double bit error has occurred, and further that the errored bits are offset by 43 bit positions due to the scrambler. Corrective action can be taken to correct the two bits in error and thus the double bit correction circuitry is selected.

If the only other combination occurs, i.e. zero syndrome and non-zero parity, it is assumed that a multiple bit error has occurred. In this case, no corrective action is taken but an error alarm signal can be generated.

The syndrome is read into the selected error detection circuit. The error detection circuit is a simple combinatorial logic circuit designed such that its output is high if the error syndrome corresponds to an error pattern with an error in the highest order bit position for the single bit error scenario (or with an error in both the highest order bit position and the bit position offset by the error multiplication distance for the double bit error scenario. Thus, if a match is found on the first attempt, then the errored bit position is assumed to be in the highest order bit position (and offset) of the received word. However, if a match is not found at the first attempt, the cyclic nature of the syndrome is used to find the errored bit position. The syndrome is shifted cyclically one bit position and a new comparison made. If a match is found then this new bit position indicates the location of the error(s).

The syndrome is therefore shifted cyclically one bit at a time until a match is found. Simultaneously the received word is shifted from the buffer register. When a match is found, indicating the errored bit positions, the bits in error may be corrected and the syndrome reset. No further corrective action is required and the remaining bits of the received word are clocked out of the buffer register.

Additional protection against mis-correction of multiple bit errors may be performed by further analysis of the computed syndrome, and a comparison of the errored bit position indicated by the process together with the knowledge of the error multiplication effects introduced by the system.

Figure 4:
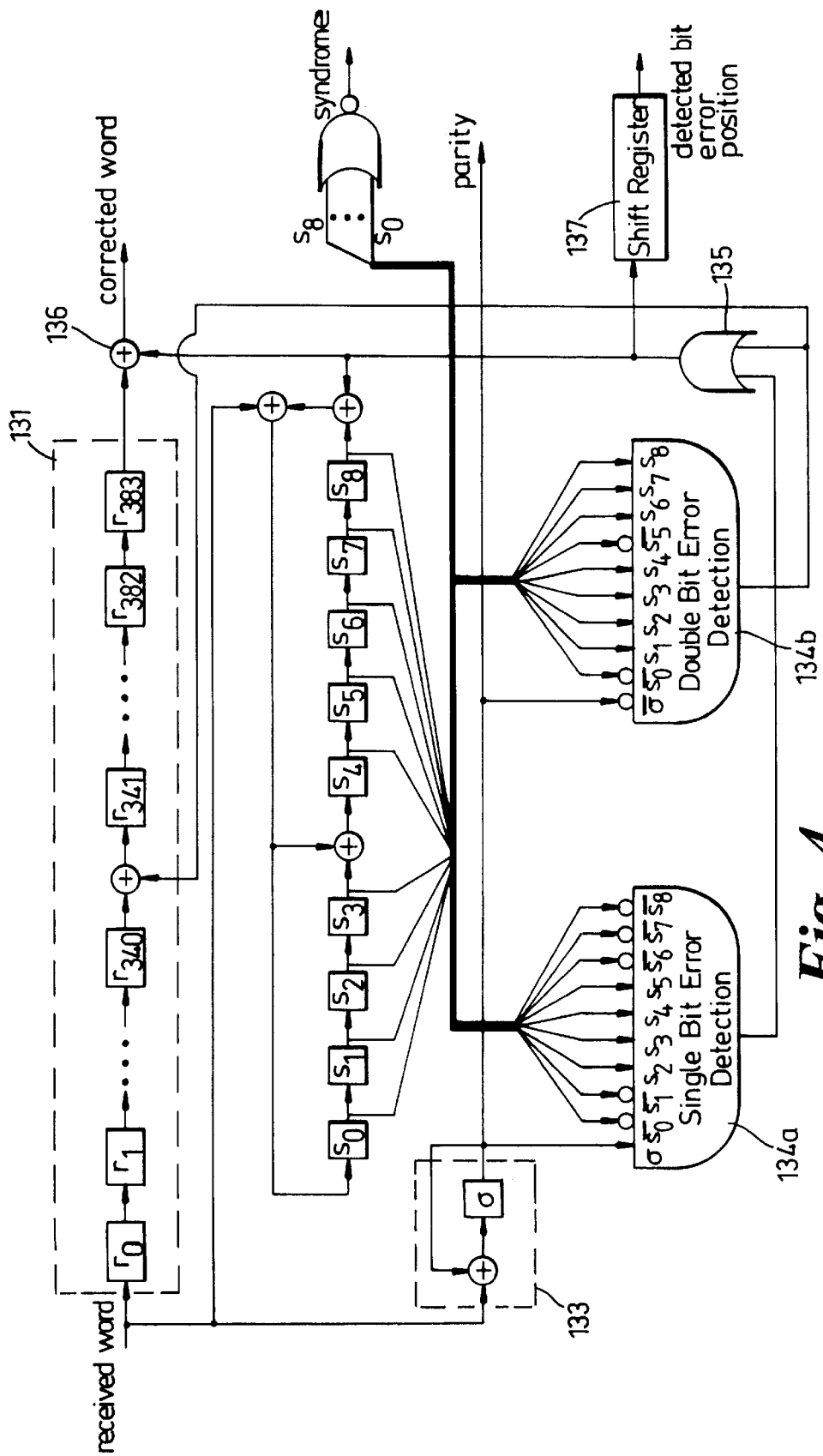
FIG. 4 shows the decoder/error correction arrangement of FIG. 3 in more detail.

The construction and operation of the decoder/error correction arrangement of FIG. 3 is shown in more detail in FIG. 4. The following description details the operation of the circuit.

1) Off-line, the error code words used by the error correction circuits are computed. The error code words are compared with the syndrome and when a match is found the bit position of the error is known. For a single bit error, the error code word is found simply by feeding a known code-word into the CRC syndrome decoder 132 with the MSB of the code word deliberately errored. The computed syndrome is used as the error code word. If the single bit error occurred in the next bit the resultant syndrome will be equal to the error code word cyclically shifted by one bit. The error code word used to detect double bit errors is similarly computed. In this case the code word fed to the syndrome decoder 132 will be errored in both its MSB and the bit offset from the MSB by 43 bits. The resultant error code words are used by the error correction circuits 134a, 134b to trap the bit errors. The actual values are dependent on the length of the payload that is protected by the CRC. If the full payload is protected, the single bit correction code-word is {0,0,1,1,1,1,0,0,0} and the double bit error code word is {0,1,1,1,1,0,1,1,1}. These error code words are entered in the single bit error and double bit error detection circuits 144a and 144b respectively.

2) The received code word is clocked into the buffer register 131. It is simultaneously input into the syndrome (132) and parity (133) circuits and the syndrome and parity computed. The corrective action of the circuit is dependent on these computed values as discussed above with reference to FIG. 3.

3) The corrective action is performed by clocking the received code-word out of the buffer register 131. At the same time, the output of the syndrome register is compared with the error code word using an AND gate 136.

If the two values match, i.e. a ONE is output from the AND gate 136, this implies that the current bit clocked from the buffer register is the bit in error. It is corrected by performing an exclusive-or operation of the AND output with the buffer-register output. Additionally, to correct a double bit error, a similar exclusive-or operation is performed on the corresponding bit that is offset by 43 locations in the buffer register. Finally, the syndrome decoder is reset to prevent further correction occurring.

If the two values do not match then the next bit is read from the buffer register and the syndrome shifted once cyclically. If after the shift, the syndrome matches the error-code word then the error position has been found and so-on.

This process continues until the contents of the buffer register have been completely output.

4) The knowledge of the positions within the payload where single bit and double bit errors can occur can be used to provide additional protection against possible mis-correction of multiple bit errors. A simple shift register 137 may be used to compute the bit position at which the error was detected (for double bit errors, the bit occurring in the most significant position is used). If a single bit error is being corrected it should lie either in the lower portion of the payload in bits 0 to 42 (indicating that the original error occurred in the previous payload and this error occurs due to the scrambler multiplication) or in the top portion of the payload in bits 341 to 383 (indicating that this is the original error and the second error will fall in the following payload). Equally for the double bit case, the two bits must fall in the 'middle' of the payload and thus the most significant errored bit can range from positions 43 to 383). If in either case the expected bit positions are incorrect then a multiple bit error in the payload must be assumed and an alarm can be generated. The table shown in FIG. 5 summarises the state table that can be used to determine the error condition of the code word.

5) Further protection against mis-correction can be performed if a single bit error condition is detected. Since the scrambler generates errors 43 bit positions apart, then if a single bit error condition is detected in one payload a further single bit error should also be detected in the following payload. The first bit error should occur in bit positions 341 to 383, the second error being 43 bits displaced from the first error in the following payload. Any detected discrepancy to this, indicates that a multiple bit error has occurred in one or both of payloads and an alarm can therefore be generated.

6) Additional detection of multiple bit errors can be achieved in the cases where the length of the code-word is shorter than the total number of syndromes that can be computed (384 compared to 510 in thus example). The unused syndromes can be computed off line and tracked. If any are generated by the decoder then a multiple error can be assumed.

It will be understood that although the error detection/correction technique has been described above with particular reference to the transmission of ATM traffic, it is in no way limited to that particular application but is of general application to digital transmission systems incorporating data scrambling and descrambling. It will also be appreciated that although the above description of a preferred embodiment is directed to the correction of double bit errors, the technique is equally applicable to the correction of multiple (i.e. including more than double) bit errors.

We claim:

1. A method of detecting and correcting random bit errors in a digital transmission system in which data is scrambled and subsequently descrambled and wherein said scrambled data is carried as a payload in an asynchronous transfer mode (ATM) cell stream, the method including parsing the descrambled data into words, determining a syndrome error word for each said data word, determining a parity error word for each said data word, leaving a said data word uncorrected when its corresponding syndrome error and parity error words are both zero, performing single bit error correction of a said data word when its corresponding syndrome error and parity error words are both non-zero, and performing double bit error correction of a said word when its corresponding parity error word is zero and its corresponding syndrome error word is non-zero.

2. A method as claimed in claim 1, wherein said single bit error correction is performed via a first error correction code, and wherein said double bit error correction is performed via a second error correction code.

3. A method as claimed in claim 2, wherein said first error correction code comprises a ninth degree primitive or irreducible polynomial.

4. A method as claimed in claim 3, wherein said second error correction code comprises the product of said first error correction code polynomial and a first degree polynomial.

5. A method as claimed in claim 4, wherein miscorrection of multiple bit errors is inhibited by comparison of the error positions with the descrambler characteristics.

6. A method as claimed in claim 5, wherein said bits correspond to symbols, and wherein said symbols correspond to elements of a Galois field.

7. A method as claimed in claim 6, wherein said symbols represent a cyclic code.

8. A method as claimed in claim 7, wherein said multiple errors are double or duplicated errors.

9. A digital transmission system comprising a transmitter incorporating means for scrambling data, a receiver incorporating means for descrambling the scrambled data received over a transmission channel from the transmitter and having means for detecting and correcting bit errors in the descrambled data, means for parsing the descrambled data into words, means for determining a syndrome error word for each said data word, means for determining a parity error word for each said data word and for leaving a said data word uncorrected when its corresponding syndrome error and parity error words are both zero, first correction means for performing single bit error correction of a said data word when its corresponding syndrome error and parity error words are both non-zero, and second correction means for performing double bit error correction of a said word when its corresponding parity error word is zero and its corresponding syndrome error word is non-zero, wherein said scrambler is an $x^{43}+1$ scrambler, wherein said first error correction means provides error correction via a first error correction code, and wherein said second error correction means provides error correction via a second error correction code.

10. A digital transmission system as claimed in claim 9, wherein said first error correction code comprises a ninth degree primitive or irreducible polynomial.

11. A digital transmission system as claimed in claim 10, wherein said second error correction code comprises the product of said first error correction code polynomial and a first degree polynomial.

12. A digital transmission system comprising a transmitter incorporating means for scrambling data and for transmitting the scrambled data as a payload in an asynchronous transfer mode (ATM) cell stream over a transmission channel, a receiver incorporating means for descrambling the scrambled data received over the transmission channel from the transmitter and having means for detecting and correcting bit errors in the descrambled data, means for parsing the descrambled data into words, means for determining a syndrome error word for each said data word, means for determining a parity error word for each said data word and for leaving a said data word uncorrected when its corresponding syndrome error and parity error words are both zero, first correction means for performing single bit error correction of a said data word when its corresponding syndrome error and parity error words are both non-zero, and second correction means for performing double bit error correction of a said word when its corresponding parity error word is zero and its corresponding syndrome error word is non-zero, wherein said first error correction means provides error correction via a first error correction code, and wherein said second error correction means provides error correction via a second error correction code.

13. A digital transmission system as claimed in claim 12, wherein said first error correction code comprises a ninth degree primitive or irreducible polynomial.

14. A digital transmission system as claimed in claim 13, wherein said second error correction code comprises the product of said first error correction code polynomial and a first degree polynomial.

* * * * *